United States Patent [19]

Sloan et al.

[11] Patent Number: 5,023,901
[45] Date of Patent: Jun. 11, 1991

[54] SURVEILLANCE SYSTEM HAVING A VOICE VERIFICATION UNIT

[75] Inventors: Paul Sloan, Croton, N.Y.; Gregory Tuai, Seattle, Wash.; Julio Jimenez; Raymond Jimenez, both of New City, N.Y.

[73] Assignee: Vorec Corporation, Tarrytown, N.Y.

[21] Appl. No.: 235,085

[22] Filed: Aug. 22, 1988

[51] Int. Cl.⁵ .................... H04M 11/04; G08B 23/00; G08B 26/00; H04Q 7/00
[52] U.S. Cl. ........................................ 379/38; 379/42; 379/49; 379/50; 340/573; 340/505; 340/539
[58] Field of Search ........................ 379/38, 42, 49, 50, 379/106; 340/505, 539, 573, 592, 825.08, 825.34, 825.36, 825.49; 382/2; 455/100; 381/42

[56] References Cited

U.S. PATENT DOCUMENTS

| | | | |
|---|---|---|---|
| 1,567,209 | 12/1925 | Toomey . | |
| 2,209,845 | 7/1940 | Overholt, Jr. | 246/41 |
| 3,115,622 | 12/1963 | Jaffe | 340/224 |
| 3,397,287 | 8/1968 | Ishii et al. | 179/2 |
| 3,478,344 | 11/1969 | Schwitzgebel et al. | 340/312 |
| 3,483,327 | 12/1969 | Schwartz | 179/2 |
| 3,564,214 | 2/1971 | Cooper, Jr. | 235/61.11 |
| 3,571,799 | 3/1971 | Coker, Jr. | 340/152 |
| 3,648,240 | 3/1972 | Jacoby et al. | 340/146.3 E |
| 3,752,904 | 8/1973 | Waterbury | 178/5.1 |
| 3,872,251 | 3/1975 | Auerbach et al. | 179/2 A |
| 3,896,266 | 7/1975 | Waterbury | 381/42 |
| 3,984,637 | 10/1976 | Caudill et al. | 179/2 DP |
| 4,011,409 | 3/1977 | Conrad | 179/2 A |
| 4,054,749 | 10/1977 | Suzuki et al. | 381/42 |
| 4,060,695 | 11/1977 | Suzuki et al. | 381/42 |
| 4,069,396 | 1/1978 | Vollnhals | 179/2 A |
| 4,082,921 | 4/1978 | Chomet | 179/2 A |
| 4,101,872 | 7/1978 | Pappas | 340/539 |

(List continued on next page.)

FOREIGN PATENT DOCUMENTS

| | | | |
|---|---|---|---|
| 0034230 | 8/1981 | European Pat. Off. . | |
| 2170977 | 8/1986 | United Kingdom | 379/98 |
| 85/01582 | 11/1985 | World Int. Prop. O. . | |

OTHER PUBLICATIONS

Hibbard et al., "Error Card Identification", IBM Technical Disclosure Bulletin, vol. 3, No. 3, Aug. 1960.
J. McCarthy, "Slumlord 'Jailed' In His Own Filthy Tenement", New York Post, 2/12/88, p. 5.
P. Shenon, "Test Program Monitors Parolees With Electronic Sensor on Ankle", New York Times, 2/10/88, p. A26.
Marconi Electronic Devices; "Electronic Monitoring Programme-The Hawk", Aug. 1988.
Offender Monitoring, "Product Trade News", vol. 1, No. 6, p. 6, Sep. 1988.

Primary Examiner—Jin F. Ng
Assistant Examiner—Wing F. Chan
Attorney, Agent, or Firm—Kenyon & Kenyon

[57] ABSTRACT

A surveillance system which integrates voice identification with a passive monitoring mechanism is described. The surveillance system comprises a central station, located at the appropriate supervising authority, and a plurality of remote voice verification units, each of which is located at a designated locality for an individual under surveillance and connected to the central station via telephone lines. The central station initializes and retrieves information from each voice verification unit. Each voice verification unit conducts a voice verification test of a respective individual according to a test schedule outlined by the central station and continuously monitors the presence of the respective individual at the designated locality. The results of the voice verification tests and the physical monitoring during a defined surveillance period are transmitted to the central station periodically or on an exigent basis depending on the application. The central station outputs the results for appropriate action by the supervising authority.

73 Claims, 2 Drawing Sheets

U.S. PATENT DOCUMENTS

| | | | |
|---|---|---|---|
| 4,126,762 | 11/1978 | Martin et al. | 179/2 A |
| 4,160,125 | 7/1979 | Bower et al. | 179/6 D |
| 4,193,061 | 3/1980 | Zoltai | 371/67 |
| 4,209,783 | 6/1980 | Ohyama et al. | 340/152 T |
| 4,214,127 | 7/1980 | Oules | 179/2 R |
| 4,223,830 | 9/1980 | Walton | 235/380 |
| 4,236,068 | 11/1980 | Walton | 235/380 |
| 4,242,663 | 12/1980 | Slobodin | 340/152 T |
| 4,331,953 | 5/1982 | Blevins et al. | 340/539 |
| 4,332,980 | 6/1982 | Reynolds et al. | 179/2 A |
| 4,338,601 | 7/1982 | Nance-Kivell | 340/870.02 |
| 4,386,266 | 5/1983 | Chesarek | 235/380 |
| 4,495,496 | 1/1985 | Miller, III | 340/825.54 |
| 4,571,455 | 2/1986 | Labock et al. | 179/2 A |
| 4,577,182 | 3/1986 | Millsap et al. | 340/539 |
| 4,578,700 | 3/1986 | Roberts et al. | 379/92 |
| 4,581,755 | 4/1986 | Sakoe | 381/42 |
| 4,590,604 | 5/1986 | Feilchenfeld | 381/42 |
| 4,593,155 | 6/1986 | Hawkins | 179/2 EA |
| 4,593,273 | 6/1986 | Narcisse | 340/539 |
| 4,596,041 | 6/1986 | Mack | 455/53 |
| 4,633,231 | 12/1986 | Kilian | 340/539 |
| 4,653,097 | 3/1987 | Watanabe et al. | 381/42 |
| 4,658,290 | 4/1987 | McKenna et al. | 358/84 |
| 4,675,656 | 6/1987 | Narcisse | 340/539 |
| 4,706,689 | 11/1987 | Man | 128/903 |
| 4,736,196 | 4/1988 | McMahon et al. | 340/573 |
| 4,747,120 | 5/1988 | Foley | 379/38 |
| 4,777,477 | 10/1988 | Watson | 340/573 |
| 4,779,198 | 10/1988 | Lurie | 364/419 |
| 4,825,457 | 4/1989 | Lebowitz | 379/59 |
| 4,843,377 | 6/1989 | Fuller et al. | 379/38 |

SURVEILLANCE SYSTEM HAVING A VOICE VERIFICATION UNIT

TECHNICAL FIELD

This invention relates to a surveillance system. More particularly, this invention relates to a surveillance system which integrates voice identification with a passive monitoring mechanism.

BACKGROUND OF THE INVENTION

Verifying compliance with the terms of a probation, parole, or a release is a difficult and onerous task for the authorities charged with that responsibility. In the past, periodic meetings and telephone conversations were usually the only mechanisms which could be utilized to locate and supervise individuals convicted of criminal acts who were not institutionally confined or incarcerated. However, recent technical innovations coupled with new criminal justice procedures have introduced alternative sentencing mechanisms. In particular, home confinement systems have been recently developed that permit a convicted individual to be restricted to his home, or a designated locality, to serve out a term of sentencing. Such systems have also been used to monitor the whereabouts of parolees and probatees whose freedom to travel has been restricted.

However, most of the presently available home confinement systems are based on radio frequency (RF) communications. In an exemplary RF system, an individual under surveillance carries an anklet or bracelet radio transmitter which transmits continuously to a centrally-located radio receiving station which monitors the presence of the individual at a designated locality. The major drawback with such a system is that it is subject to outside interference which can be caused by many different sources, for example, house obstructions; electrical fields produced by electric motors, fluorescent lights, and the like: environmental conditions: and external radio signals. Further, if power transmission is raised to overcome an interference, an RF system may cause radio interference with third party devices, such as televisions or telephones, and possibly violate federal communication regulations. Second, RF systems are passive monitoring systems which do not provide a positive identification of an individual under surveillance but instead rely on the security of the anklet/bracelet connection. In addition, presently available RF systems lack the capability to immediately retest the presence of an individual in the event the system cannot detect the individual's presence. Therefore, in the case of a system failure or interference, an RF system may set off a false alarm.

Active monitoring systems that carry out voice verification tests over standard telephone lines have also been developed. Although these systems may not experience the aforementioned problems of RF systems, they nonetheless are subject to various technical problems. For example, the standard telephone handset is designed to transmit only the necessary frequencies and amplitudes associated with intelligible voice transmission and not all the characteristics of speech needed for voice verification. In addition, the standard telephone handset inherently has a limited dynamic range that will introduce severe harmonic distortion outside its dynamic range and, thus, can cause false voice recognition. Further, ordinary telephone lines used in such systems will introduce additional distortion because of their limited dynamic range and noise that regularly appears on telephone lines (e.g., background hiss, ringing, cross talk, and echoes). Devices and techniques used to overcome these limitations can be costly to incorporate into an active monitoring system and may degrade a system's performance.

SUMMARY OF THE INVENTION

Briefly, the invention provides a surveillance system having a central station which stores data regarding the status of each individual under surveillance and a plurality of remote stations, each of which is located at a designated locality for a respective individual. The central station has an input to receive data and an output to transmit data and command signals to the remote stations. Each remote station is in the form of a voice verification unit having a first input to receive data and command signals from the central station, inputs to receive active and passive monitoring signals from a respective individual, test means for analyzing the active and passive monitoring signals according to the data and command signals received from the central station, and an output to transmit the analysis results from the test means to the central station. In addition, the surveillance system includes means for selectively connecting the central station with each of the remote stations.

Each remote station can include an electroacoustic transducer connected to a second input for receiving as an active signal a preselected series of spoken words by a respective individual. Each remote ,station can also include a receiver element connected to a third input for receiving as a passive signal a continuous signal transmitted from a respective individual indicating the individual's presence at a designated locality. The test means can also cooperate with a signalling element which emits a signal to prompt the respective individual to speak the preselected series of words into the electroacoustic transducer.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
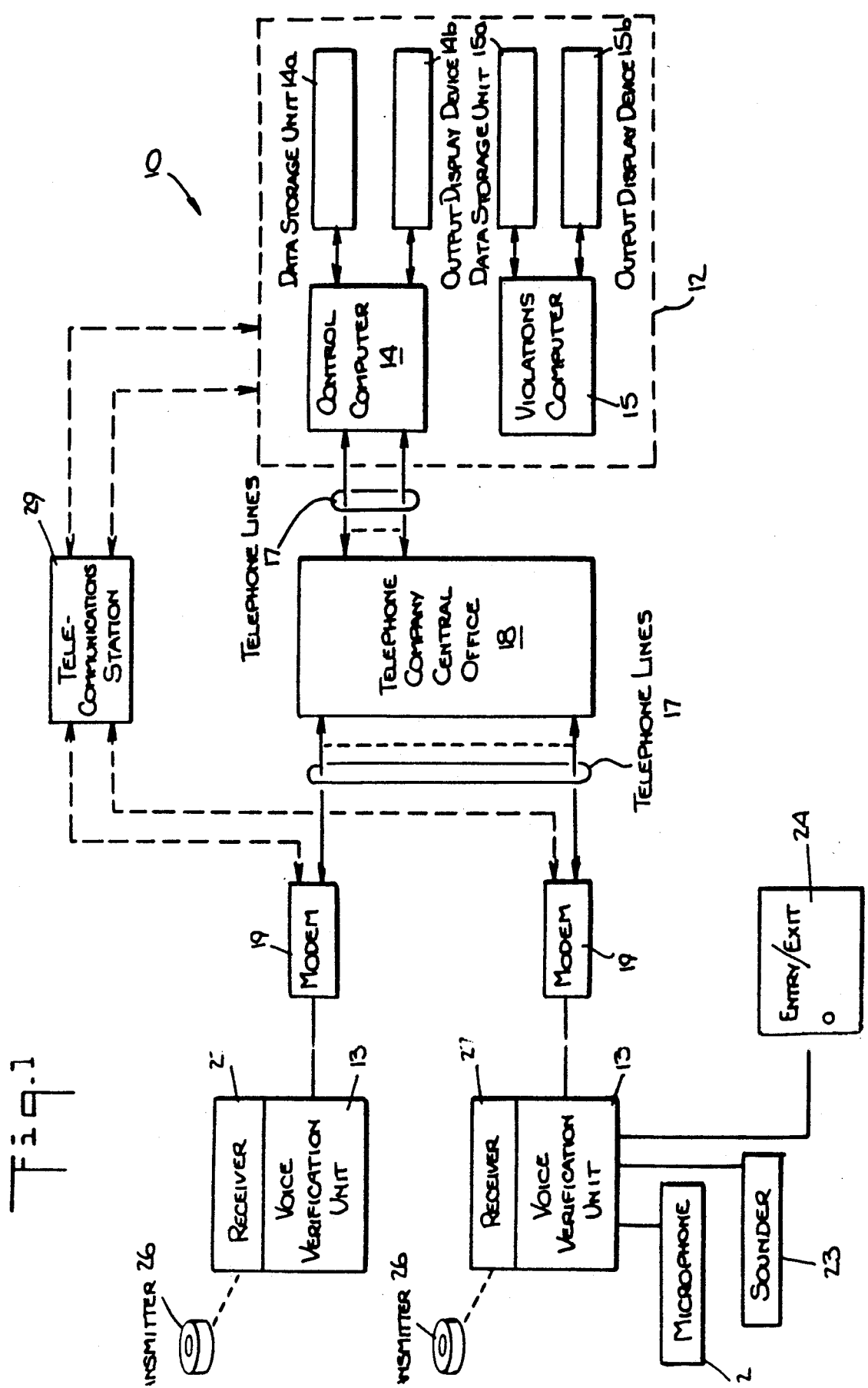
FIG. 1 is a block diagram of a surveillance system constructed in accordance with the invention.

Referring to FIG. 1, the surveillance system 10 comprises a central station 12, located at the appropriate supervising authority, such as the local probation department or police precinct, and a plurality of remote stations in the form of voice verification units (VVU) 13, each of which is located at a designated locality, or localities, for a respective individual under surveillance, such as an individual's home, a place of employment, or a rehabilitation clinic.

The central station 12 maintains and analyzes all relevant data for each individual under surveillance and initializes and retrieves information from each VVU 13. The central station 12 comprises a control computer 14 and a respective data storage unit 14a, 15a, such as a magnetic disk drive, and a respective output display device 14b, 15b, such as a printer, a CRT, a CRT-printer combination, etc. The control o computer 14 is connected to an input of the central station 12 to receive data from the VVU's 13 and to an output of the central station 12 to transmit data and command signals used to initialize the VVU's 13. The violations computer 15 is connected only to the input of the central station 12 to receive data, in the form of test analysis results, from the VVU's 13.

The central station 12 is connected to each remote VVU 13 via an ordinary telephone line 17 and the local telephone company central office 18. If desired or warranted by the application, each VVU 13 may have a dedicated telephone line 17 to the central station 12 or to each computer 14, 15 therein. Further, the system 10 is not restricted to local telephone areas as long distance telephone lines and switching stations may also be utilized. Each telephone line 17 connects, at a respective designated locality, to a telephone modem 19 which can be tied to or incorporated within the respective VVU 13. The modem 19 can be an off-the-shelf product having, for example, a 1200/300 baud rating and autoanswer capability.

Each VVU 13 has a first input connected to the modem 19 to receive data and command signals from the central station 12 and inputs to receive active and passive monitoring signals from an individual under surveillance. Each VVU 13 has test means (not shown) connected via a second input to an associated microphone 22, or other electroacoustic transducer, which receives active monitoring signals in the form of a preselected series of spoken words by the individual. The microphone 22 can be configured as required by the application, for example, as a handset similar to those found in pay telephone stations, as a free-standing speaker, as a handset-speaker combination, etc. The test means is also connected via a third input to passive surveillance elements, as described below, to receive the passive monitoring signals. The test means (not shown) of the VVU 13 analyzes the active and passive monitoring signals according to a stored algorithm and certain data and command signals received from the central station 12. The test means is also connected via an output to a means for prompting, such as a signalling element which emits a signal to prompt an individual to speak a preselected series of words into the microphone 22. The signalling element can be, for example, a sounder 23, comprising a piezoelectric element, which emits an audible signal to prompt an individual to speak. Each VVU 13 also has an output connected to the modem 19 to transmit the analysis results from the test means to the central station 12.

A VVU 13 provides various functions on an ongoing basis. Primarily, a VVU 13 performs a voice verification test on the individual who answers the prompt signals from the sounder 23 and records the results internally. Upon initialization or actuation by the central station 12 at the start of a monitoring period, the VVU 13 will establish a test schedule and conduct the voice verification test according to the schedule. The test schedule is randomly created for each monitoring period, e.g., daily, and is in compliance with the terms of the respective sentence, parole or probation. In addition, the VVU 13 monitors the condition of the telephone line 17 as well as the power line which supplies the operating power for the unit. The status of each utility line for the monitoring period is recorded along with the test results. Further, the VVU 13 can, if desired, monitor certain external events that require immediate notification to the central station 12. For example, the VVU 13 can be connected, either directly or via a radio frequency mechanism, to sensors at the points of entry/exit 24 (i.e., doors, windows, garages, etc.) on the premises of a designated locality in those applications requiring house arrest of an individual. In the event of an entry/exit 24 being used, the VVU 13 can automatically transmit that information to the central station 12. Further, the VVU 13 can monitor its own housing and automatically inform the central station 12 of any tampering with the housing. This can be implemented as indicated in FIG. 2 for example by way of a detecting means such as a tamper switch element 28 for monitoring the security of the VVU by transmitting data to the central station 12.

The system 10 also contains continuous passive surveillance elements which are integrated with the active voice verification elements. In particular, the system 10 also comprises a signal transmitter 26 which can be conveniently configured as an anklet or bracelet and which is securely attached to the individual under surveillance. The anklet/bracelet transmitter 26 continuously transmits a signal, such as a radio frequency signal, to a receiver 27 connected to the third input of the respective VVU 13 at the designated locality. Any interruption or disruption of the signal will cause the receiver 27 to actuate the VVU 13 to conduct an unscheduled voice verification test if the VVU is programmed to do so. In addition, the receiver 27 detects any tampering with the transmitter 26 and immediately informs the central station 12 via the VVU 13. The transmitter 26-receiver 27 combination can be an off-the-shelf product.

The central station 12 may also be connected to the modem 19 at the designated localities via at least one telecommunications station 29 as provided by the local telephone company or other telecommunications entity. The telecommunications station 29 represents an alternative telecommunications technology to eliminate the risk of a telephone line disruption or failure between the central station 12 and a remote VVU 13. For example, the technology may utilize cellular telephones, long distance radio frequency transmission, microwave transmission, etc. Depending on the technology and the application, the telecommunications station 29 may or may not be situated at a designated locality. Also, the modem 19 may not be necessary for the operation of the system 10 if the VVU 13 can communicate with the telecommunications station 29 without an intermediate device.

Figure 2:
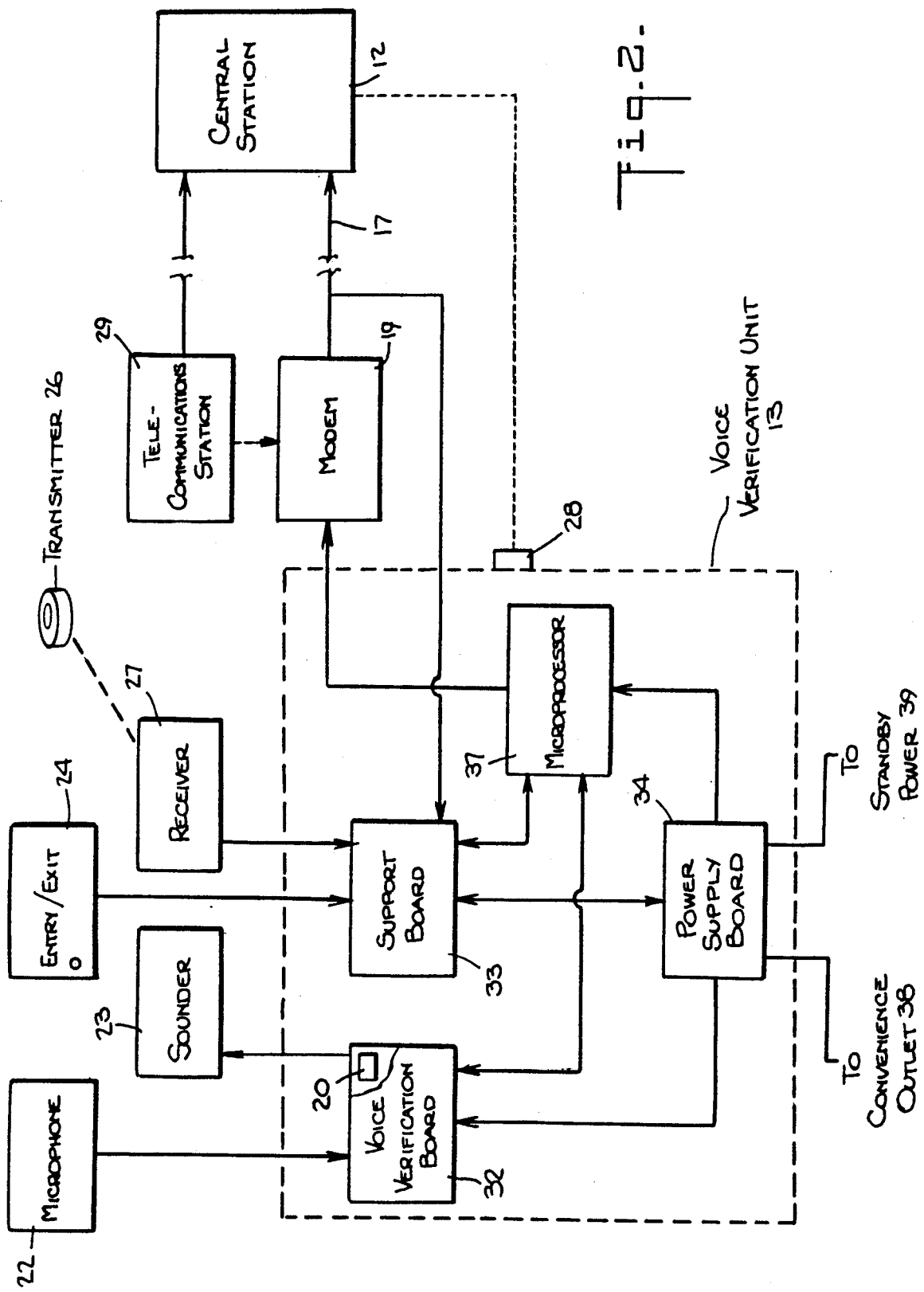
FIG. 2 is a block diagram of a single voice verification unit connected to a central station of the surveillance system of FIG. 1.

Referring to FIG. 2, each VVU 13 comprises four integrated circuit components: a voice verification board 32, a support board 33, a power supply board 34, and a microprocessor 37 with the voice verification board 32 and the support board 33 constituting the test means.

The voice verification board 32 acts as a means for conducting voice verification tests of an individual according to a test schedule and contains test element circuitry which implements speech recognition/verification functions to positively identify the individual under surveillance whose voice is used as an input signal to the circuitry. Exemplary circuitry is the K3 Speech Recognition integrated chip set manufactured by Nippon Electric Company, Ltd. of Tokyo, Japan. The Voice verification board 32 also contains certain input/output circuitry for the VVU 13. As indicated above, an input of the voice verification board 32 is connected to the associated microphone 22 for the VVU 13 and, thus, utilizes the voice, i.e., the transduced voice, of the individual under surveillance as an input signal. The transduced voice is analyzed according to the stored algorithm of the test element circuitry and the analysis results appear at an output of the voice verification board 32.

The support board 33 acts as a means for establishing a test schedule in response to a signal from the central station 12 and provides a range of ancillary functions for the VVU 13. For example, the support board 33 contains memory circuitry to store all VVU 13 activity, such as the various monitoring activities and the analysis results from the voice verification board 32 output, until the central station 12 requests the information and in the event of a disruption or failure with the modem 19 or communication channels between the VVU 13 and the central station 12. The capacity of the temporary storage is a function of the application and economics although a five day back-up is sufficient and cost-effective in most cases. The temporary storage also has a limited life so that if the contents are not removed within a prescribed time period then the contents can be written over by succeeding information. The support board 33 has additional memory circuitry that is used to contain code and instructions (e.g., EPROM code, etc.) and RAM necessary for the operation of the microprocessor 37. In addition, the support board 33 monitors the passive surveillance elements of the system 10, such as the transmitter 26-receiver 27 combination, the telephone line status, the power line status, the sensors at the points of entry/exit 24, and any tampering of the VVU 13 housing and of the transmitter 26. The support board 33 also contains the clock and calendar for the VVU 13. Note that the support board 33 can monitor additional sensors as required as well as key switches which can be used to issue local commands to the VVU 13.

The power supply board 34 provides regulated power to the components of the VVU 13 from a conventional power source, such as a standard convenience outlet 38. In the event of a power disruption or outage, the power supply board 34 connects an on-board, stand-by power source (not shown), such as a lithium battery, to operate the memory circuitry and the clock on the support board 33 and employs an off-board, stand-by power source 39, such as a standard 12 volt battery, to operate the remainder of the components of the VVU 13. The power requirements of the VVU 13 are sufficiently low that stand-by power can operate the VVU 13 for lengthy periods of time if necessary.

The microprocessor 37 controls the operation of the VVU 13. The microprocessor 37 comprises a mother board (not shown) which is the interface between the microprocessor 37 and the other components of the VVU 13, i.e., the voice verification board 32, the support board 33 and the power supply board 35. The microprocessor 37 also comprises a programmable logic element (not shown) that directs the overall operation of the VVU 13 in accordance with a software program stored on the support board 33 and establishes a voice verification test schedule for the voice verification board 32 in accordance with data and command signals received from the central station 12. The microprocessor 37 further comprises input/output circuitry which controls the modem 19 to enable the VVU 13 to communicate with the central station 12.

A VVU 13 and the central station 12 communicate using different formats or information packets according to the information to be exchanged. An initialization packet is transmitted from the control computer 14 to the microprocessor 37 of each VVU 13 at the start of a monitoring period. The initialization packet can contain the phone number of the central station 12 used to report test violations or failures, a case number to identify a respective individual under surveillance, and the test schedule parameters which include the start and end times of a voice verification test and the number and interval of tests within the schedule. A data packet is transmitted back and forth between the control computer 14 and a microprocessor 37 at various times. The data packet contains date and time information as well as status information. A time packet is transmitted from the control computer 14 to a microprocessor 37 to synchronize the local clock and calendar; the packet only contains date and time information. A violation/service packet is transmitted by a VVU 13 to the violations computer 15 upon certain conditions, which depend on the application. For example, the packet can be transmitted upon the failure of a voice verification test by an individual, upon an unscheduled request by the central station 12, or upon a regularly scheduled request from the central station 12 along with other data. The violation/service packet contains the case number of the individual, time and date information, and status information. The status information in the data and violation/service packets can contain such information as the telephone line status (active/inactive), the power line status (active/inactive), the source of the test actuation (test schedule/radio frequency signal interruption), the test result, and test response (individual responded/individual did not respond).

In addition to the exchange of information packets, the control computer 14 also transmits commands to the microprocessor 37 of each VVU 13. As a safety feature, all commands require password verification prior to execution to prevent any tampering with a VVU 13. The current password is stored by the support board 33 and the verification of the password is performed by the microprocessor 37. The main commands of the control computer 14 direct a VVU 13 to a) receive an initialization packet using the modem protocol (in response, a VVU 13 generates a test schedule and begins processing voice verification tests); b) to transmit all voice verification records as data packets using the modem protocol; to transmit the violation/service packet; and d) to receive, or to transmit, all data including the initialization packet, schedule and verification records and to begin processing current password, performing local diagnostics, and receiving a time packet. Note that all information exchanged between a VVU and the central station 12, including data and commands, can be encrypted as a security measure.

Upon installation of a VVU 13 at a designated locality, the voice of an individual under surveillance must be enrolled with the VVU 13 so that the unit can recognize the voice during a subsequent voice verification test. If desired, an individual can be enrolled again at the start of each monitoring period or of selected periods. The enrollment process has two steps, level determination and training, which take into account four major factors affecting the verification: 1) the particular words chosen to test an individual, since people say words differently; 2) the number of times a word is trained; 3) the number of chances to say the word correctly; and 4) a security level value. Each of the above-mentioned factors are carefully chosen to maintain a low possibility of false verification and false rejection while allowing for the normal variation found in speech.

The first step of the enrollment process requires an individual to say a word a number of times into the microphone 22 until the test element circuitry on the voice verification board 32 detects a consistent speaking level. This level is stored in the support board 33 and used during future verification tests. The second step requires an individual to speak the words to be used during an actual voice verification test. As an example, three different words can be selected: A, B, and C. The VVU 13 can be programmed to train each of the words a number of times and, thus, allow for a greater variation in the individual's speaking manner. However, in such case, there is a trade off. If the number of times a word is trained is too large, the variation tolerance increases and the possibility of false verifications increases. Upon installation of a VVU 13, the number of times a word is trained should be greater than at the start of subsequent monitoring periods because of the unfamiliarity of an individual with the VVU 13. Once the individual's understands what is expected, the number of times a word is trained can be reduced for subsequent monitoring periods and, consequently, the possibility of false verification is reduced.

During the second step, an individual will speak the selected words in sequence two times the number of times a word is to be trained. The VVU 13 uses the first sequence of A, B, and C to create templates for the words which are stored in the support board 33 and used during a future voice verification test. The VVU 13 uses the second sequence of A, B, and C to check for proper recognition of the words just trained. This insures that the individual and the VVU 13 are communicating. In this example, if the words are to be trained four times, the result of the second step is the creation of a set of 12 templates, 4 templates for each of the three words.

During an actual voice verification test, the VVU 13 will prompt, via a signal, an individual to speak each of the words a number of times. The words are prompted in a random order to prevent the use of a simple tape recorder to cause a false verification. The number of times each word is to be spoken is determined by the number of tries plus one, the number of tries being a programmable parameter of the VVU 13. Increasing the number of tries allows the individual more chances to correctly speak the words for proper verification. However, as with the number of times each word is trained, increasing the number of tries also increases the chances of a false verification.

The additional time an individual must speak each word (the "plus one" mentioned above) is used by the VVU 13 to establish and maintain a dynamic set of templates. Hidden among the prompt signals used for Verification are prompt signals to train and create new templates. If an individual's identity is verified during a test, the VVU 13 replaces the oldest set of templates with the new templates. Establishing and maintaining a dynamic set of templates allows for normal voice variations over a period of time. For example, a cold could alter an individual's voice such that verification would be impossible. By establishing and maintaining a dynamic set of templates, the subtle changes in a voice at the onset of the cold, and as the cold subsides, would be incorporated by the VVU 13.

Finally, the last parameter affecting verification is the security level value which is arbitrarily established as having a base value, for example, 10. Increasing the value allows for a greater latitude in the way an individual speaks a particular word. Decreasing the value decreases the difference allowed between the previously trained word and the spoken word. Decreasing the value to zero would require an individual to speak the word exactly as it was spoken when trained.

In operation, after the installation of a VVU 13 and at the start of a monitoring period, the control computer 14 at the central station 12 places a telephone call to the VVU 13 at a designated locality for a respective individual under surveillance. The control computer 14 places the telephone call by using appropriate polling software although other means may be used depending on the application (e.g. an automatic calling system). The modem 19, with its auto-answer capability, answers the incoming telephone call received from the telephone line 17. Instantaneously, the control computer 14 at the central station 12 transmits a command signal to the VVU 13 (through the modem 19) to receive an initialization packet using the modem 19 protocol. The microprocessor 37 of the VVU 13 receives the command signal and performs a comparison of the password contained in the signal with the current password stored in the support board 33. Upon verification of the password, the microprocessor 37 executes the command and prepares for receipt of the packet.

The initialization packet is transmitted by the control computer 14 either with the command signal or immediately thereafter. Upon password verification, the packet is accepted by the microprocessor 37. In response to the packet, the microprocessor 37 randomly generates or establishes a voice verification test schedule using the parameters provided in the initialization packet, i.e., start time, test intervals, number of tests and end time. The control computer 14 also transmits a time packet to synchronize the clock and calendar on the support board 33. At the time of installation of a VVU 13, or when desired, the VVU 13 may be tested on site after the initialization process to insure that the regular testing routine can proceed.

At the start time of the test schedule, the voice verification board 32 will begin a voice verification test. The voice verification board 32 will prompt or summon the individual under surveillance to the VVU 13 by actuating the sounder 23 to emit a series of audible tones. The individual then speaks the test words into the microphone 22 in response to additional prompt signals actuated by the voice verification board 32. The voice verification board 32 uses the transduced voice from the microphone 22 as an input signal for the test element circuitry 20. The transduced voice is analyzed and compared, according to the stored algorithm, to the templates formed during the enrollment process. If the test is passed by the individual, the microprocessor 37 replaces the oldest set of templates which are stored in the support board 33 with the newly created templates from the hidden trainings. To eliminate false alarms, a second voice verification test is conducted automatically in the event the first test was failed by the individual or the individual did not respond. The VVU 13 will then conduct the next test, regardless of the current test results, according to the test schedule.

The individual under surveillance also carries the anklet/bracelet transmitter 26 which continuously emits a signal, such as a radio frequency signal, that is monitored by the receiver 27 connected to the support board 33 of the VVU 13. The receiver 27 will cause the microprocessor 37 to actuate the voice verification board 32 to conduct an unscheduled voice verification test whenever the signal is disrupted or interrupted for any length of time. This can occur if the individual leaves the designated locality and, thus, goes beyond the receiver's range, or if the transmitter 26-receiver 27 combination is tampered with or malfunctions. In addition, the voice verification board 32 conducts a second test in the event the unscheduled test was failed or the individual did not respond.

In addition to conductinq the voice verification tests, the VVU 13, and in particular, the support board 33, monitors the telephone line and the power line to the VVU 13. In the event of a power failure, the support board 33 alerts the power supply board 34 to switch from the convenience outlet 38 to stand-by power, i.e., the back-up batteries. In the event of a telephone line failure, the support board 33 alerts the microprocessor 37 to record the event for later retrieval. The failure of either utility will be recorded by the support board 33 for subsequent transmission to the central station 12 as part of the status information for a monitoring period. If desired, the support board 33 can also monitor sensors at the points of entry/exit 24. In the event of an entry or exit being used, e.g., an attempted door opening, the VVU 13 will . automatically transmit that information to the central station 12 for appropriate action as well as store the violation as part of the status information.

In the event of a failure or a non-response to a voice verification test, the microprocessor 37 automatically place a telephone call via the modem 19 to the central station 12 using the phone number received in the initialization packet. If a busy signal is reached at the central station 12, the VVU 13 will continue to call, using additional telephone numbers stored on the support board 33, until a connection is made. Upon connection, the microprocessor 37 transmits a violation/service packet to the central station 12. The input of the central station 12 identifies the packet, via code information contained therein, as containing violation information and routes the packet directly to the violations computer 15. The violations computer 15 compiles and analyzes the status information contained in the packet and routes the information to the associated data storage unit 15a (for a periodic report to be outputted later on by the associated output display device 15b) and to the associated output display device 15b (for an immediate report).

In addition, the results of all tests and monitored events are stored and maintained in a detailed log in the support board 33. The detailed log is normally transmitted to the central station 12 in response to a regularly scheduled request (i.e., a polling schedule) by the control computer 14, e.g daily. The control computer 14 can also command the microprocessor 37 to transfer the detailed log, or any verification records the support board 33 continues to store, at any time. The information packet received by the central station 12 is identified, via code information contained therein, as containing status information and is routed directly to the control computer 14. The information is compiled and analyzed by the control computer 14 which then routes the information to the associated data storage unit 14a and to the associated output display device 14b. Both periodic and immediate reports can then be generated as desired. The detailed log is not deleted from the support board 33 upon transmission but continues to be stored until overwritten by new information.

The embodiment described herein is merely illustrative of the principles of the present invention. Various modifications may be made thereto by persons ordinarily skilled in the art without departing from the scope or spirit of the invention.

What is claimed is:

1. A surveillance system comprising
a central station for storing data regarding the status of each individual under surveillance, said station having an input to receive data and an output to transmit data and command signals;
a plurality of remote stations, each located at a designated locality for a respective individual and having a first input to receive data and command signals from said central station, a second input to receive active monitoring signals from a respective individual, a third input to receive passive monitoring signals from a respective individual, test means to analyze the active and passive monitoring signals according to the data and command signals received from said central station, storage means connected to said test means for receiving and storing the analysis results from said test means; an output to transmit data and the analysis results from said storage means to said central station, and monitoring means for monitoring the condition of a power line which supplies operating power for said remote station, said monitoring means being connected to said output to transmit the data from said monitoring means to said central station; and
means for selectively connecting said central station with each said remote stations.

2. A surveillance system comprising
a central station for storing data regarding the status of each individual under surveillance, said station having an input to receive data and an output to transmit data and command signals;
a plurality of remote stations, each located at a designated locality for a respective individual and having a first input to receive data and command signals from said central station, a second input to receive active monitoring signals from a respective individual, a third input to receive passive monitoring signals from a respective individual, test means to analyze the active and passive monitoring signals according to the data and command signals received from said central station, storage means connected to said test means for receiving and storing the analysis results from said test means; and an output to transmit data and the analysis results from said storage means to said central station, monitoring means for monitoring the condition of the entrance and exit of the designated locality, said monitoring means being connected to said output to transmit the data from said monitoring means to said central station; and
means for selectively connecting said central station with each said remote stations.

3. A surveillance system comprising
a central station for storing data regarding the status of each individual under surveillance, said station having an input to receive data and an output to transmit data and command signals;

a plurality of remote stations, each located at a designated locality for a respective individual and having a first input to receive data and command signals from said central station, a second input to receive active monitoring signals from a respective individual, a third input to receive passive monitoring signals form a respective individual, test means to analyze the active and passive monitoring signals according to the data and command signals received from said central station, storage means connected to said test means for receiving and storing the analysis results from said test means; an output to transmit data and the analysis results from said storage means to said central station, detecting means for detecting tampering of the remote station, said detecting means being connected to said output to transmit data from said detecting means to said central station; and means for selectively connecting said central station with each said remote stations.

4. A voice verification unit for the surveillance of an individual at a designated locality comprising;

an electroacoustic transducer for receiving the voice of the individual under surveillance and converting the voice into an equivalent electrical signal;

a voice verification board for analyzing said equivalent electrical signal according to a stored algorithm to identify the received voice as the voice of the individual under surveillance;

a signalling element for prompting the individual under surveillance to speak into said electroacoustic transducer according to a randomly established test schedule;

a support board for storing each analysis result from said voice verification board during the test schedule; and a microprocessor for actuating said signalling element a multiplicity of times during said test schedule.

5. A surveillance system comprising a plurality of remote stations, each station being located at a designated locality for a respective individual and having a first input to receive a passive monitoring signal indicative of the presence at a respective locality of a respective individual, a second input to receive an active monitoring signal from the respective individual, a signalling element for prompting the respective individual to generate the active monitoring signal in accordance with a predetermined test schedule within a programmed monitoring period, test means for receiving and analyzing the active monitoring signals from time-to-time in accordance with said test schedule during said monitoring period to verify the identity of the respective individual, and storage means connected to said test means for receiving and storing the analysis results from said test means during said monitoring period;

a central station having an input for receiving and storing the analysis results from each remote station and an output for transmitting data to each respective remote station corresponding to a respective individual and a command signal to each remote station to establish a monitoring period; and means for selectively connecting said central station to a respective remote station at the end of a monitoring period thereof to receive the analysis results stored therein.

6. The system of claim 5 wherein said central station comprises a data storage element for storing data and analysis results received at said input from said remote stations and an output display element for displaying selective data and analysis results stored by said data storage element.

7. The system of claim 5 wherein each remote station comprises an electroacoustic transducer connected to said second input for receiving as an active signal a preselected series of spoken words by a respective individual and a receiver element connected to said first input for receiving as a passive signal a continuous signal transmitted from a respective individual indicating the individual's presence at a designated locality.

8. The system of claim 5 wherein said central station comprises at least one computer for compiling and analyzing data and the analysis results received at said input of said central station from said remote stations and for formulating data and command signals transmitted at said output of said central station to said remote stations.

9. The system of claim 8 wherein said central station comprises a second computer for compiling and analyzing the analysis results received at said input from the remote stations.

10. The system of claim 5 wherein said means for selectively connecting comprises at least one telephone line operably connected between said central station and each remote station.

11. The system of claim 10 wherein said means for selectively connecting further comprises a modem at each remote station which operably connects a respective telephone line to said storage means of the respective remote station.

12. The system of claim 10 wherein said means for selectively connecting comprises an automatic telephone calling system at said central station which operably connects a respective telephone line between said central station and a respective remote station according to a polling schedule.

13. The system of claim 5 wherein said means for selectively connecting comprises means for operably connecting said central station with said remote stations automatically according to a polling schedule.

14. The system of claim 5 wherein said means for selectively connecting comprises means for providing cellular telephone service between said central station and each remote station.

15. The system of claim 5 wherein said means for selectively connecting comprises means for providing long distance radio frequency transmission between said central station and each remote station.

16. A surveillance system comprising a central station for storing data regarding the status of each individual under surveillance, said station having an input to receive data and an output to transmit data and command signals;

a plurality of remote stations, each located at a designated locality for a respective individual and having a first input to receive data and command signals from said central station, a second input to receive active monitoring signals from a respective individual, a third input to receive passive monitoring signals from a respective individual, an electroacoustic transducer connected to said second input for receiving as an active signal a preselected series of spoken words by a respective individual, a receiver element connected to said third input for receiving as a passive signal a continuous signal transmitted from a signal transmitter attached to a respective individual indicating the individual's presence at a designated locality, test means to analyze the active and passive monitoring signals according to the data and command signals received from said central station, a signalling element connected to said test means to emit a signal to prompt the respective individual to speak the preselected series of words into said electroacoustic transducer, a programmable logic element for actuating said signalling element according to a randomly established schedule, storage means connected to said test means for receiving and storing the analysis results from said test means; and an output to transmit data and the analysis results from said storage means to said central station; and means for selectively connecting said central station with each said remote station.

17. The system of claim 16 wherein said signalling element is a sounder which emits an audible signal to prompt the respective individual to speak the preselected series of words into said electroacoustic transducer.

18. A surveillance system as set forth in claim 16 further comprising monitoring means in each remote station for monitoring the condition of said means for selectively connecting said central station thereto, said monitoring means being connected to said output of a respective remote station to transmit data from said monitoring means to said central station.

19. A voice verification unit for the surveillance of a individual at a designated locality comprising;

an electroacoustic transducer for receiving the voice of the individual under surveillance and converting the voice to an equivalent electrical signal;

a signalling element for prompting the individual under surveillance to speak into said electroacoustic transducer;

a transmitter to be carried by the individual under surveillance for emitting a passive signal;

a receiver for monitoring said passive signal and outputting a second signal in response to an interruption of said passive signal from said transmitter;

a support board for actuating said signalling element upon receipt of said output signal from said receiver; and a voice verification board having means for analyzing said equivalent electrical signal to determine whether the voice received by said electroacoustic transducer is the voice of the individual under surveillance.

20. A device for the surveillance of an individual at a designated locality comprising an electroacoustic transducer for receiving the voice of the individual under surveillance and converting the voice into an equivalent electrical signal;

a voice verification board for analyzing the equivalent electrical signal and positively identifying the received voice as the voice of the individual under surveillance;

a signalling element for prompting the individual under surveillance to speak into the electroacoustic transducer;

a transmitter to be carried by the individual under surveillance for continuously emitting a signal;

a receiver for detecting an interruption of the signal emitted from said transmitter;

a support board for storing the analysis results from said voice verification board and the detection of signal interruptions from the receiver; and a microprocessor for actuating said signalling element according to a randomly established schedule and upon detection of a signal interruption by the receiver.

21. The device of claim 20 further comprising a power supply circuit for supplying operating power to the device and for connecting a stand-by power source to the device in the event of an outage of the operating power.

22. The device of claim 21 wherein the support board monitors the operating power for the device and actuates the power supply circuit to connect the stand-by power source to the device in the event of an outage of the operating power.

23. A system for the remote surveillance of an individual comprising a central station for storing data regarding the surveillance of the individual;

a remote station located at a designated locality for the individual and connected to said central station, said remote station having means for establishing a test schedule in response to an actuating signal from said central station and means for conducting periodic voice verification tests of the individual according to the test schedule, said remote station delivering the results of said tests to said central station at the end of said test schedule;

a transmitter to be carried by the individual for continuously emitting a signal; and a receiver connected to said remote station for monitoring the signal emitted by said transmitter and actuating said remote station to conduct an unscheduled voice verification test in response to an interruption of the signal.

24. The system of claim 23 wherein the central station comprises at least one computer for transmitting an actuating signal to the remote station and for compiling and analyzing the results of said voice verification tests delivered by the remote station.

25. The system of claim 23 wherein the central station comprises a first computer for delivering test parameters to the means for establishing a test schedule and a second computer for compiling and analyzing the results of said voice verification tests delivered by the remote station.

26. The system of claim 23 wherein the central station comprises a data storage element for storing the results of said voice verification tests delivered by the remote station and an output display device for visually displaying at least some of said results.

27. The system of claim 23 wherein the central station comprises a data storage element for storing the results of said voice verification tests delivered by the remote station and a visual display element having a viewing screen for displaying said results.

28. The system of claim 23 wherein the central station comprises a data storage element for storing the results of said voice verification tests delivered by the remote station and an output display device for displaying said results.

29. The system of claim 23 wherein the remote station further comprises a tamper switch element for monitoring the security of the remote station, said remote station delivering the data from the tamper switch element to said central station.

30. The system of claim 23 wherein the receiver further comprises means for detecting tampering of the transmitter, said receiver actuating the remote station to deliver the data from the means for detecting to said central station.

31. The system of claim 23 which further comprises an electroacoustic transducer for receiving a preselected series of spoken words by the individual and converting the received words into an equivalent electrical signal, said means for conducting voice verification tests being connected to said transducer to analyze the equivalent electrical signal to determine whether the voice received by said electroacoustic transducer is the voice of the individual.

32. The system of claim 31 which further comprises a signalling element which emits a signal to prompt the individual to speak the preselected series of words into said electroacoustic transducer.

33. The system of claim 31 which further comprises a signalling element which emits a first signal to prompt the individual to repeat the preselected series of words in the event said means for conducting voice verification tests determines that the voice first received by said electroacoustic transducer is not the voice of the individual.

34. The system of claim 31 which further comprises a signalling element which emits a first signal to prompt the individual to speak the preselected series of words into said electroacoustic transducer and which emits a second signal to prompt the individual to speak the preselected series of words in the event the individual failed to speak said words in response to the first prompt signal.

35. The system of claim 23 wherein the signal continuously emitted by the transmitter comprises a radio frequency signal.

36. The system of claim 23 wherein the remote station conducts a second voice verification test in the event that the unscheduled voice verification test actuated by the receiver is failed by the individual.

37. The system of claim 23 wherein the remote station conducts a second voice verification test in the event that the individual did not respond to the unscheduled voice verification test actuated by the receiver.

38. The system of claim 23 wherein the remote station further comprises means for monitoring the condition of a power line which supplies the operating power for the remote station, said remote station delivering the data from the means for monitoring to said central station.

39. The system of claim 23 wherein the remote station further comprises means for monitoring the condition of the entrance and exit of the designated locality, said remote station delivering the data from the means for monitoring to said central station.

40. The system of claim 23 further comprising a sensor at each entrance and exit for the designated locality which informs the remote station when a respective entrance and exit is being utilized, said remote station delivering the data from the sensors to said central station.

41. The system of claim 23 wherein the remote station further comprises means for detecting tampering of the remote station, said remote station delivering the data from the means for detecting to said central station.

42. A device for the surveillance of an individual at a designated locality which integrates voice identification with a passive monitoring mechanism, comprising:

an electroacoustic transducer for receiving the voice of the individual under surveillance and converting the voice to an equivalent electrical signal;

a signalling element for prompting the individual under surveillance to speak into said electroacoustic transducer;

a transmitter to be carried by the individual under surveillance for continuously emitting a signal;

a receiver for monitoring said signal emitted by said transmitter and outputting a signal in response to an interruption of said signal from said transmitter; and test means for actuating said signalling element according to a randomly established schedule and upon receipt of an output signal from said receiver, said test means having means for analyzing said equivalent electrical signal to determine whether the voice received by said electroacoustic transducer is the voice of the individual under surveillance.

43. The device of claim 42 wherein the signalling element comprises a sounder which emits an audible signal.

44. The device of claim 42 wherein the signal emitted by the transmitter comprises a radio frequency signal.

45. The device of claim 42 wherein said test means comprises means for monitoring the output signal from said receiver.

46. The device of claim 42 wherein the means for analyzing comprises a voice verification board for storing electrical signals equivalent to the voice of the individual and circuitry for comparing said equivalent electrical signal from said electroacoustic transducer with the stored electrical signals.

47. The device of claim 42 further comprising a stand-by power source and means for monitoring the power line for supplying operating power to the device and connecting the stand-by power source to the device in the event of a power outage of the power line.

48. A device for the surveillance of an individual at a designated locality which integrates voice identification with a passive monitoring mechanism, said device comprising means for continuously monitoring the presence of the individual under surveillance at the designated locality;

means for prompting the individual under surveillance to voice a series of predetermined sounds whenever the presence of the individual at the designated locality is not detected by said means for continuously monitoring;

means for receiving the voiced series of predetermined sounds and converting the voiced sounds into an equivalent electrical signal; and means for processing the equivalent electrical signal to determine whether the received sounds are voiced by the individual under surveillance.

49. The device of claim 48 wherein the means for continuously monitoring comprises a transmitter carried by the individual for continuously emitting a signal and a receiver for receiving the signal, the presence of the individual at the designated locality being determined by the uninterruption of the signal received by the receiver.

50. The device of claim 49 wherein the signal emitted by the transmitter comprises a radio frequency signal.

51. The device of claim 49 wherein the second means for prompting comprises means for monitoring the receiver and prompting the individual in response to an interruption of said signal received by the receiver.

52. The device of claim 48 wherein said means for prompting comprises a sounder which emits an audible signal to prompt an individual to voice the series of predetermined sounds.

53. The device of claim 48 wherein the means for receiving comprises an electroacoustic transducer.

54. The device of claim 48 wherein the means for processing comprises test element circuitry for analyzing the equivalent electrical signal according to a stored algorithm.

55. The device of claim 48 wherein the means for processing comprises test element circuitry for comparing the equivalent electrical signal to electrical signals stored therein equivalent to a series of predetermined sounds previously voiced by the individual.

56. The device of claim 48 further comprising a stand-by power source and means for monitoring the power line supplying operating power to the device and connecting the stand-by power source to the device in the event of a power outage of the power line.

57. The device of claim 48 wherein said means for prompting comprises a signalling element which emits a signal to prompt the individual to voice the series of predetermined sounds.

58. The device of claim 57 wherein the first means for prompting further comprises a programmable logic element which randomly establishes a schedule pursuant to which the signalling element emits a signal to prompt the individual to voice the series of predetermined sounds.

59. The device of claim 48 wherein the means for continuously monitoring comprises means for detecting a signal continuously transmitted from a signal transmitter attached to an individual at the designated locality.

60. The device of claim 59 wherein the second means for prompting comprises means for monitoring the means for detecting and prompting the individual in response to an interruption of said signal transmitted from the individual.

61. A system for reporting the status of an individual under surveillance at a designated locality comprising
a station located at the designated locality for monitoring the continuing presence of the individual under surveillance at the locality, conducting a voice verification test of the individual at randomly scheduled intervals and whenever the presence of the individual at the locality is not detected, and storing the results of each test;
means for transmitting the results of each test from said station;
a data storage unit for receiving the results of each test from said means for transmitting and compiling the results into a predetermined format;
means for displaying the compiled results of each test; and
means for controlling the times at which said means for transmitting and said means for displaying are actuated.

62. The system of claim 61 wherein the station comprises a transmitter carried by the individual for continuously emitting a signal and a receiver for receiving the signal, said receiver actuating the station to conduct an unscheduled voice verification test in response to an interruption of the signal.

63. The system of claim 61 wherein the means for transmitting comprises at least one telephone line operably connected between the station and the data storage unit.

64. The system of claim 61 wherein the means for displaying comprises a visual display element having a viewing screen for displaying the compiled results stored by the data storage unit.

65. The system of claim 61 wherein the means for controlling comprises means for automatically actuating the means for transmitting according to a polling schedule.

66. The system of claim 61 wherein the means for controlling comprises a computer which actuates the means for transmitting according to a polling schedule.

67. The system of claim 61 wherein the means for controlling comprises a computer which actuates the means for transmitting according to a programmable polling schedule and actuates the means for displaying upon command.

68. The system of claim 61 wherein the means for transmitting comprises a modem connected to the station which operably connects the at least one telephone line with the data storage unit and transmits the results of each test to the data storage unit.

69. The system of claim 61 wherein the means for transmitting comprises means for providing cellular telephone service between the station and the data storage unit.

70. The system of claim 61 wherein the means for transmitting comprises means for providing long distance radio frequency transmission between the station and the data storage unit.

71. The system of claim 61 wherein the data storage unit comprises a computer for compiling the results of each test into a predetermined format and a storage element for storing the compiled results.

72. The system of claim 71 wherein the means for controlling comprises a second computer which actuates the means for transmitting according to a polling schedule.

73. The system of claim 61 wherein the means for displaying comprises a printing element for printing the compiled results stored by the data storage unit.

* * * * *

UNITED STATES PATENT AND TRADEMARK OFFICE
CERTIFICATE OF CORRECTION

PATENT NO. : 5,023,901

DATED : June 11, 1991

INVENTOR(S) : PAUL SLOAN, et al

It is certified that error appears in the above-identified patent and that said Letters Patent is hereby corrected as shown below:

```
Column 2, line 67 after "a" insert -violations computer 15, each
   of which is connected to a-
Column 3, line 2 after "control" delete "o"
Column 4, line 67 change "Voice" to -voice-
Column 6, line 44 change "a)" to -(a)-
Column 6, line 47 change "b)" to -(b)-
Column 6,  line 49 change "d)" to -(d)-
Column 6, line 49 change "to transmit" to -(c) to transmit"
Column 6, line 52 after "processing" insert -verification tests.
   Other commands can include changing the current-
Column 7, line 60 change "Verification" to -verification-
Column 9, line 16 change  "conductinq" to - conducting-
Column 9, line 31 after "will" delete -.-
Column 9, line 36 change "place" to -places-
```

Signed and Sealed this

Ninth Day of February, 1993

*Attest:*

STEPHEN G. KUNIN

*Attesting Officer*      *Acting Commissioner of Patents and Trademarks*